United States Patent
Terefinko et al.

(10) Patent No.: US 6,454,540 B1
(45) Date of Patent: Sep. 24, 2002

(54) MODULAR BALANCED FOAM FLOW SYSTEM

(75) Inventors: John M. Terefinko, Bethlehem; Richard L. Taylor, Jim Thorpe, both of PA (US)

(73) Assignee: Kovatch Mobile Equipment Corp., Nesquehoning, PA (US)

( * ) Notice: Subject to any disclaimer, the term of this patent is extended or adjusted under 35 U.S.C. 154(b) by 0 days.

(21) Appl. No.: 09/539,855

(22) Filed: Mar. 31, 2000

(51) Int. Cl.[7] ............................................... F04B 49/00
(52) U.S. Cl. ........................................... 417/46; 169/13
(58) Field of Search ............................. 417/46; 169/24, 169/14, 15, 13; 366/10; 700/275; 566/10

(56) References Cited

U.S. PATENT DOCUMENTS

| | | | |
|---|---|---|---|
| 4,189,005 A | * 2/1980 | McLoughlin | 169/24 |
| 4,417,601 A | 11/1983 | Bennett | 137/556.65 |
| 4,436,487 A | 3/1984 | Purvis et al. | 417/46 |
| 4,474,680 A | * 10/1984 | Kroll | 516/10 |
| 4,899,825 A | * 2/1990 | Bosoni et al. | 169/14 |
| 5,174,383 A | 12/1992 | Haugen et al. | 169/15 |
| 5,218,988 A | 6/1993 | McNamara et al. | 137/101.21 |
| 5,232,052 A | 8/1993 | Arvidson et al. | 169/14 |
| 5,284,174 A | 2/1994 | Norman | 137/5 |
| 5,291,951 A | * 3/1994 | Morand | 169/14 |
| 5,313,548 A | 5/1994 | Arvidson et al. | 388/14 |
| 5,411,100 A | 5/1995 | Laskaris et al. | 168/14 |
| 5,427,181 A | 6/1995 | Laskaris et al. | 169/14 |
| 5,494,112 A | 2/1996 | Arvidson et al. | 169/13 |
| RE35,362 E | 10/1996 | Arvidson et al. | 169/13 |
| 5,680,329 A | * 10/1997 | Lloyd et al. | 700/275 |
| 5,727,933 A | 3/1998 | Laskaris et al. | 418/2 |
| 5,764,463 A | 6/1998 | Arvidson et al. | 361/31 |
| 5,803,596 A | * 9/1998 | Stephens | 366/10 |
| 5,979,564 A | * 11/1999 | Crabtree | 169/15 |
| 6,009,953 A | * 1/2000 | Laskaris et al. | 169/13 |

* cited by examiner

Primary Examiner—Teresa Walberg
Assistant Examiner—Leonid M Fastovsky
(74) Attorney, Agent, or Firm—Duane Morris LLP

(57) ABSTRACT

A liquid injection arrangement for inserting a foaming agent into water for a fire fighting application, or a similar use, requires that metered quantities of a liquid chemical foamant or other agent be injected into a conduit assembly conveying a water stream. A desired concentration of foamant requires varying the foamant flow as a function of water flow. A tank holds a quantity of liquid chemical foamant, and at least one pump has an inlet port coupled to the tank and an outlet port coupled to the conduit assembly. A hydraulic motor drives the pump and a valve is coupled with the hydraulic motor and a source of pressurized hydraulic fluid. A sensor is placed adjacent to the outlet port of the pump to feed back a signal representing the pressure of the water flowing through the conduit assembly, and a control system is responsive to the signal and to a flow rate of water flowing through the conduit assembly, producing a signal for controlling a speed at which the hydraulic motor drives the foamant pump. A feed-back loop is provided that monitors the flow rate and pressure of the water in order to control the foamant flow. The foamant outlet and the water/foam outlet pressure sensor are placed at substantially the same position in the flow so that the foam addition can be controlled to produce an accurately metered quantity of the liquid foamant in the water stream exiting the conduit assembly and to maintain the desired concentration.

16 Claims, 2 Drawing Sheets

MODULAR BALANCED FOAM FLOW SYSTEM

FIELD OF THE INVENTION

This invention relates generally to fire-fighting equipment, and more particularly to a system for accurately controlling the introduction of a liquid chemical foamant concentrate into a water stream.

BACKGROUND OF THE INVENTION

Foamant delivery systems often employ fixed displacement pumps to deliver a measured quantity of concentrated liquid foaming agent, i.e., a foamant, to one or more discharge streams driven by a water pump associated with a firefighting vehicle or other apparatus. The foamant and water mix, preferably in accurate proportions, and produce a foam discharge that is directed onto a fire or onto combustible fuel.

In truck-mounted systems, pumps are usually driven by the truck motor, via a power take off arrangement. Mechanical pumps (e.g., a gear coupled to the truck motor), hydraulic motor power take-offs, and electrical pumps are all possible and a variety are conventionally known.

In a pump and foamant insertion arrangement, it is necessary to set and/or control and balance the flow conditions of the water and foamant in order to achieve a predetermined proportion of foamant volume to water volume. The pressure/flow conditions are advantageously monitored and controlled so as to maintain the balance and correct proportion, either by automatic control or manual adjustment. If the wrong proportion of foamant is used, the resulting foam may be less effective than it might be at suppressing a fire, and use of too much foamant can be a waste of money and/or can exhaust a limited supply of foamant before a fire has been extinguished.

For example, foamant concentrate supply conduits may lead from a foamant pump into a manifold for mixing. A foamant conduit may open into a water flow at a venturi. These and other devices can be used to discharge a concentrated foamant stream into a water conduit in series with a water pump. To maintain the proportion of foamant to water needed, the discharge flow rate of the foamant should be maintained at a percentage selected by an operator. One can assume that operation of the water pump produces a given water flow rate and then inject foamant at a rate that is proportional to operation of the pump. Proportioning valves controlled by the water flow rate (e.g., the rate of operation of the water pump) can be placed between the foamant concentrate supply conduits and the water discharge outlets. These valves operate either to selectively isolate the discharge outlets from the concentrate pump (i.e., in the closing direction) or to inject or increase the proportionate amount of foamant concentrate being fed into the water (in the opening direction).

An example of such a system in the prior art is disclosed in U.S. Pat. No. 5,232,052- Arvidson et. al. The Arvidson patent discloses a fire-fighting system in which a liquid chemical foamant is introduced into a pumped water stream. The foamant is added in varying amounts in an effort to maintain a predetermined percentage mixture of foamant concentrate volume to water volume, and to keep the percentage or proportion independent of variations in the water flow. Arvidson's apparatus includes a motor-driven pump controlled over first and second speed ranges by pulse width modulation of the drive signal applied to the motor. An intermittent motion is produced, by burst modulating the drive signal, when the pulse width modulation is operating at a minimum duty cycle. Using this technique, the range of available motor speeds is extended beyond that which can be achieved using pulse width modulation of the motor drive signal alone.

Prior apparatus and methods for controlling flow when introducing liquid concentrate foaming agent into pumped water have often proved inefficient and wasteful as a means for dispensing the relatively expensive concentrate. Sensing volume flow rates and controlling an injection flow rate based on sensed flow is not a trivial problem. Pump operation, pressures, and flow rates can be interactive in that operational variations in certain parameters of operation can affect other parameters, sometimes affecting the particular parameter that might be used to infer a flow rate or to control the flow rate of foamant and/or water. As an example, a conventional system may provide a separate flow meter for determining the flow rate of foamant, or may assume a particular flow rate from the measured speed or from a driving signal applied to a positive displacement piston pump. A separate flow meter may add significantly to the expense of such as system, especially if multiple discharges and hence multiple flow meters and multiple control loops are needed. Moreover, the prediction of foam flow based only on pump speed is not accurate over a broad range of flows and pressures. Thus the added expense of the sensing and control loops is not the end of cost concerns. The relative inaccuracy and lack of precision involved are such that such systems also waste a certain amount of foaming agent.

SUMMARY OF THE INVENTION

The present invention addresses and improves upon a number of aspects of the prior art by providing a foam injection system applicable to a truck or other installation having many outlets, perhaps many diameters and a wide range of potentially required water and/or foam flow rates. In its broadest aspects, a liquid injection arrangement is provided that inserts a foaming agent into water for a fire fighting application, or a similar use requiring that metered quantities of a liquid chemical foamant or other agent be injected into a conduit assembly conveying a water stream. A desired concentration of foamant requires variation of the flow of foamant as a function of the flow of water. A tank holds a quantity of liquid chemical foamant, and at least one pump has an inlet port coupled to the tank and an outlet port coupled to the conduit assembly. A hydraulic motor drives the pump and a valve is coupled with the hydraulic motor and a source of pressurized hydraulic fluid. A sensor is placed adjacent to the outlet port of the pump to feed back a signal representing the pressure of the water flowing through the conduit assembly, and a control system is responsive to the signal and to a flow rate of water flowing through the conduit assembly, producing a signal for controlling a speed at which the hydraulic motor drives the foamant pump. A feed-back loop is provided that monitors the flow rate and pressure of the water in order to control the foamant flow. The foamant outlet and the water/foam outlet pressure sensor are placed at substantially the same position in the flow so that the foam addition can be controlled to produce an accurately metered quantity of the liquid foamant in the water stream exiting the conduit assembly and to maintain the desired concentration.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF THE PREFERRED EMBODIMENT

Figure 1:
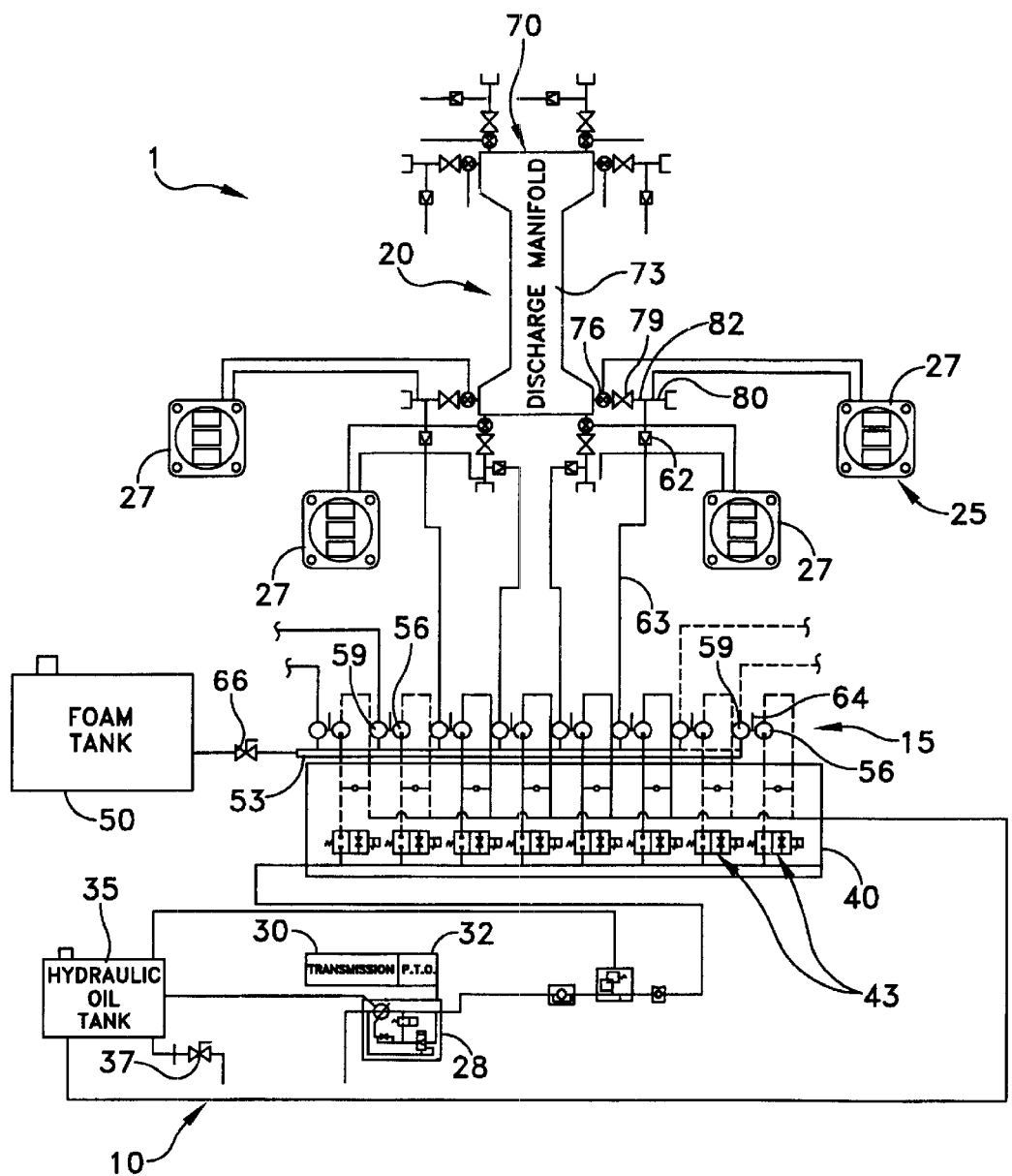
FIG. 1 is a schematic representation of a modular proportioning foam system formed in accordance with the present invention.

This description of preferred embodiments is intended to be read in connection with the accompanying drawings, which are to be considered part of the entire written description of this invention. In the description, terms implying an orientation or relative position refer to the drawing figure under discussion and are not intended as limiting the invention to such orientation or position. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

In a preferred embodiment of the invention as shown in FIG. 1, modular proportioning foam system 1 operates in connection with a firefighting apparatus, which may comprise a vehicle such as a conventional fire truck, fire boat or the like, or may be a part of a larger system or a stationary system such as a portion of the infrastructure of a building, ship, or airplane.

In broad terms, modular proportioning foam system 1 comprises a power source 10, a foamant delivery assembly 15, a water delivery assembly 20, and a control system 25. More particularly, power source 10 in this embodiment provides motive force, via hydraulic fluid, for operation of various pumps utilized in modular proportioning foam system 1. Power source 10 is of a type conventionally provided on fire trucks and the like, and includes a hydraulic pump 28 operatively interconnected with the transmission 30 of the vehicle engine, or to an auxiliary engine, or to another source of motive force 32 such as an electric motor drive or the like. Hydraulic pump 28 is in regulated flow communication with hydraulic fluid reservoir 35, and provides a flow of hydraulic fluid under pressure. Drain valve 37 is placed in the line therebetween. Preferably the hydraulic flow and the pressure thereof are provided by a variable displacement pump, such as the Mannesmann Rexroth series A10V0. Power source 10 is operatively connected to a hydraulic manifold 40, so as to provide a flow of hydraulic fluid under pressure, via a proportional hydraulic flow valve 43, to foamant delivery assembly 15 and thereby conveying motive power from the power take off or other source. A proportional hydraulic flow control valve that has been found to provide adequate results is the EPV series valve manufactured by the Vickres Company.

Proportional hydraulic flow valve 43 may be operated as an output element of a feed-back loop, that monitors the flow rate and pressure of the water in order to control the foamant flow, and may be controlled by an operator through control system 25. Control system 25 is based on a conventional microprocessor and includes a programmed processor coupled to inputs including sensing and control devices, computational or logical means, a memory, and outputs including control displays 27 that are accessible to the operator of the firefighting apparatus.

Foamant delivery assembly 15 comprises at least one foamant concentrate storage tank 50, a header manifold 53, a fixed displacement hydraulic motor 56, a foamant pump 59, and a foamant injection check valve 62. Foamant concentrate storage tank 50 is arranged in regulated flow communication with header manifold 53, via valve 66, so as to provide liquid concentrate foamant to header manifold 53. It will be understood that a plurality of tanks 50 may be included so that various foamants can be used as appropriate. Hydraulic motor 56 is arranged in regulated flow communication with hydraulic manifold 40, and proportional flow hydraulic flow valve 43, from which it is provided with pressurized hydraulic fluid for sustained operation. A fixed displacement hydraulic motor that has been found to provide adequate results is the model A2FM manufactured by the Mannesmann Rexroth Company.

Foamant pump 59 advantageously comprises a rotary gear pump, such as the model 20 manufactured by the Edward Company. Foamant pump 59 preferably is capable of operation in the relatively wide range from approximately 200 to 3600 revolutions per minute (rpm), to accommodate corresponding breadth in the range of control for the water flow between approximately 5% and 100% of its maximum capacity. At least one foamant pump 59 is arranged in flow communication with header manifold 53, from which it draws foamant during operation, and with a foamant conduit 63.

A plurality of foamant pumps 59 and foamant conduits 63 may be interconnected to header manifold 53. A speed sensor 64 is interconnected with each foamant pump 59, and is arranged to provide an electrical signal indicative of the speed of foamant pump 59 as an input to control system 25. For example, a Hall-effect type rpm sensor may be used with good effect. Typically a 0–5 vdc TTL signal is generated when a magnetic flux from a rotating magnet passes the Hall-effect sensor for signaling incremental rotation of the pump. Foamant injection check valve 62 is operatively interconnected to a portion of foamant conduit 63, adjacent to the intersection between foamant conduit 63 and water delivery assembly 20.

Water delivery assembly 20 comprises a water pump 70, a discharge manifold 73, a discharge flow meter 76, a discharge flow control valve 79, and a pressure transducer 80. More particularly, water pump 70 is in regulated flow communication with a source of water, e.g., a holding tank, lagoon, hydrant, or the like, and is preferably a centrifugal pump, such as the ones manufactured by either Hale Company or Waterous Company, which are well known in the art. Typically, water pump 70 has a capacity in the range from approximately 40 to 3000 or more gallons per minute (gpm). It will be understood that a plurality of water pumps 70, likewise may be utilized with the present invention. Very often, discharge manifold 73 forms a part of water pump 70. Discharge manifold 73 is interconnected in flow communication with a conduit 82 which is in flow communication with a discharge fixture (i.e., a conventional hose and nozzle, not shown). Conduit 82 is operatively coupled to a discharge flow meter 76, discharge flow control valve 79, pressure transducer 80, and foamant injection check valve 62.

Advantageously, this arrangement allows for the direct measurement of both the water pressure and foam pressure at the specific location along conduit 82 where liquid foamant concentrate is introduced into the flow of water from discharge manifold 73. Pressure transducer 80 is positioned within the wall of conduit 82, and is preferably a ceramic capacitive type pressure transducer, where a diaphragm and substrate form the basic sensing element of a variable capacitor that is proportional to the applied pressure. This type of sensor is also known as a ratiometric pressure transducer with an excitation voltage of about 5 volts dc. The operating temperature is in the range from about −40 degrees centigrade to about +125 degrees centigrade, and with an accuracy of about +/−0.5% of the maximum voltage span.

A plurality of conduits each comprising an operative interconnection to a discharge flow meter 76, a discharge flow control valve 79, a pressure transducer 80, and a foamant injection valve 62 may be provided in connection with the present invention. Thus the invention may include, for example, a number of different discharge conduits to which hoses of different diameters might be coupled, via fittings at different locations around the fire truck. Each includes the necessary water and foamant drive and sensing arrangements to apply the invention to each of such conduits.

The modular proportioning foam system 1 of the invention operates to control foamant introduction into a water stream as follows. When foam is not required, an on/off switch positioned on a control panel is left in the "off" mode, and proportional hydraulic flow valve 43 is completely closed. With no hydraulic pressure to hydraulic motor 56 driving foamant pump 59, there is no rotation and therefore foam concentrate does not flow. Foamant injection check valve 62, which is down stream of foamant pump 59, ensures that no water will backflow to foamant pump 59 or foamant concentrate storage tank 50.

When foamant flow is required from a discharge port on the fire fighting apparatus, the on/off switch associated with that discharge port on display/controller 27 is put in the "on" mode. The operator can select the desired percent of foamant injection, based upon the type of foam being used and the application desired. The typical range available to the operator for selection generally is from about 0.1% to about 10%. This selection range of percentages can be uniquely chosen for each discharge port available. It is an important aspect of the invention that the predetermined selected proportion of foam is accurately controlled and maintained.

Once the desired foamant concentration is set, the controller reads the water flow sensed by flow meter 76, the water/foam pressure sensed by pressure transducer 80, and the percent concentration of foamant, to determine the required foam concentrate flow. By combining the water flow and sensed pressure, proportional hydraulic flow valve 43 is opened or closed until the speed that corresponds to the required flow of foam, at the operating pressure is reached. The water flow and pressure are monitored on a regular frequency in order to adjust foamant pump speed for any change in values, or any change in values ( e.g., water pressure or water flow rate made by the operator to the desired foamant percent concentration.

The foam output pressure causes foamant injection check valve 62 to open, and liquid foamant concentrate flows into the water downstream of a discharge valve. Foamant pump 59 is also responsive to any changes in the water/foamant flow made by a nobleman at the end of a discharge hose. When the nozzle is closed, a water flow sensor will indicate "no flow" and close proportional hydraulic flow valve 43, stopping foamant pump 59. As the discharge nozzle is opened or otherwise varied to any point between positions at which the flow may be fully throttled or opened completely, flow meter 76 and pressure transducer 80 sense the relative changes in flow and pressure, and provide corresponding signals to control system 25 so as to maintain the required foamant pump speed.

According to an inventive aspect, the invention provides a signal to control system 25 that represents a measure of the discharge water pressure. The discharge pressure signal may be read directly on the discharge line display/controller 27, which fulfills a National Fire Prevention Assn. (NFPA) requirement for the pump panel. However, at this specific point, the water pressure is effectively equal to the foamant pump discharge pressure at this same location, namely adjacent to the pressure sensor and foam injection point. With this equality in pressure known, using both the foam pump speed and known foam discharge pressure gives excellent accuracy over the entire operating range of foam pump 59.

Figure 2:
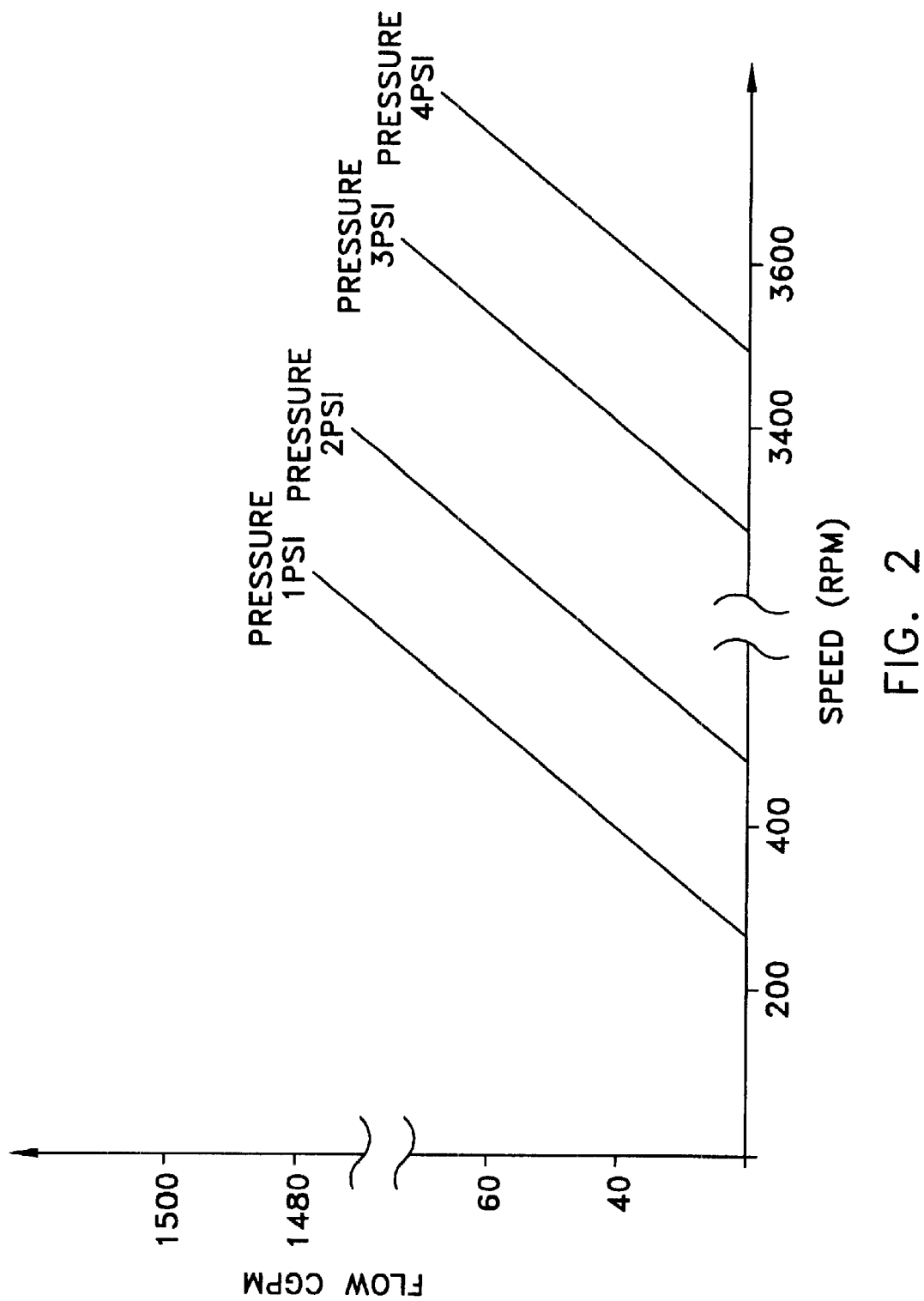
FIG. 2 is a graphical representation of the performance characteristics of a rotary gear pump used in connection with the present invention.

FIG. 2 demonstrates the relationship of speed and flow in pump performance curves. The performance parameters in the embodiment shown substantially demonstrate a linear relationship (equal slopes) of flow versus speed, with different offsets at different pressures. The performance parameters can be encoded into a matrix or lookup table accessible from controller/display 27. Alternatively the slope and offset can be encoded and used to calculate operational parameters at a point on the curves, using the microprocessor controller. The performance parameters as thus accessibly stored, allow the use of the measured foamant pump speed and foamant pump pressure to predict the actual foam flow with a high degree of accuracy. Thus according to the invention, the system is responsive to a signal representative of water flow and both a foam pump speed signal and a foam pump output pressure signal which is equal to the water pressure measured via pressure transducer 80. Advantageously, the invention uses both the rotary gear foam pump speed and the outlet pressure to predict the foam flow. This is accomplished through a "look-up" table in display/controller 27, similar to the data shown in FIG. 2.

The invention is by no means limited only to the particular constructions herein disclosed and shown in the drawings as examples, but also comprises modifications and reasonable equivalents within the scope of the invention as defined by the appended claims.

What is claimed is:

1. An apparatus in which metered quantities of one or more liquid chemical foamants are injected into at least one conduit assembly conveying a water stream so as to maintain a desired concentration of said chemical foamant in said water stream, comprising:

at least one tank for holding a quantity of said liquid chemical foamants;

at least one foam pump having an inlet port coupled to said tank and an outlet port coupled to said at least one conduit assembly;

a hydraulic motor connected in driving relation to said at least one foam pump;

a valve coupled with said hydraulic motor and a source of pressurized hydraulic fluid;

a first sensor operatively coupled to said at least one conduit assembly to sense the rate of flow of the water stream flowing through said at least one conduit assembly and producing a first signal representative of said water flow rate;

a second sensor operatively coupled to said at least one conduit assembly adjacent to said outlet port of said at least one foam pump to sense the pressure of both the water and foam chemical stream flowing through said at least one conduit assembly and producing a second signal representative of said water and foam chemical pressure; and a control system responsive to said first signal and said second signal for producing a signal for controlling a speed at which said hydraulic motor is driving said at least one foam pump, such that a desired quantity of the liquid chemical foamant in the water stream exiting said at least one conduit assembly maintains said desired concentration.

2. An apparatus according to claim 1 wherein said control system includes a feed-back loop to monitor the flow rate and pressure of the water and adjust said hydraulic motor speed driving said foam pump and thereby to control the flow rate of said liquid chemical foamant.

3. An apparatus according to claim 1 wherein said at least one pump comprises a rotary gear pump.

4. An apparatus according to claim 2 wherein a proportional hydraulic flow valve operates as an output element of said feed-back loop.

5. An apparatus according to claim 1 wherein said control system comprises a conventional microprocessor including a programmed processor coupled to inputs including sensing and control devices, computational and logical means, a memory, and output control displays that are accessible to an operator.

6. An apparatus according to claim 1 comprising a plurality of storage tanks arranged in regulated flow communication with a header manifold so as to provide said liquid concentrate foamant to said header manifold.

7. An apparatus according to claim 6 wherein said plurality of tanks each include a different liquid concentrate foamant.

8. An apparatus according to claim 1 wherein said hydraulic motor is arranged in regulated flow communication with a hydraulic fluid manifold, and a proportional flow hydraulic flow valve, from which said hydraulic motor is provided with pressurized hydraulic fluid for sustained operation.

9. An apparatus according to claim 3 wherein said pump is capable of operation in the range from approximately 200 to 3600 revolutions per minute so as to accommodate corresponding breadth in the range of control for water flow between approximately 5% and 100% of its maximum capacity.

10. An apparatus according to claim 3 wherein said at least one pump is arranged in flow communication with a header manifold, so as to draw said liquid concentrate foamant during operation, and with a foamant conduit.

11. An apparatus according to claim 1 wherein a plurality of pumps are interconnected to a header manifold so as to draw said liquid concentrate foamant during operation, and with a plurality of foamant conduits.

12. An apparatus according to claim 10 comprising a water delivery system and an injection check valve operatively interconnected to a portion of said conduit, adjacent to an intersection between said conduit and said water delivery system.

13. An apparatus according to claim 12 wherein said water delivery system comprises:

a water pump disposed in regulated flow communication with a source of water and having a capacity in the range from approximately 40 to 3000 or more gallons per minute;

a discharge manifold interconnected in flow communication with a water discharge fixture;

a water conduit operatively coupled to a discharge flow meter, a discharge flow control valve, and a pressure transducer and adjacent to said injection check valve thereby allowing for the direct measurement of both the water pressure and foam pressure at a specific location along said water conduit where liquid foamant concentrate is introduced into said water.

14. An apparatus according to claim 13 wherein said pressure transducer is positioned within a wall of said water conduit.

15. An apparatus according to claim 1 wherein said liquid foamant concentrate is available for selection in the range is from about 0.1% to about 10%.

16. An apparatus in which metered quantities of a liquid chemical foamant are injected into a plurality of conduit assemblies conveying a water stream so as to maintain a desired concentration of said chemical foamant in said water stream, comprising:

a tank for holding a quantity of said liquid chemical foamant;

a plurality of rotary gear foam pumps each having an inlet port coupled to said tank and an outlet port coupled to one of said plurality of conduit assemblies;

a plurality of hydraulic motors each connected in driving relation to one of said plurality of rotary gear foam pumps;

a plurality of valves each coupled with one of said plurality of hydraulic motors and a source of pressurized hydraulic fluid;

a plurality of first sensors each operatively coupled to one of a plurality of said conduit assemblies to sense the rate of flow of a water stream flowing through said one of a plurality of conduit assemblies and producing a plurality of first signals representative of said water flow rate in each of said conduit assemblies;

a plurality of second sensors each operatively coupled to one of a plurality of conduit assemblies adjacent to said outlet port of each of a plurality of rotary gear foam pumps to sense the pressure of both the water and foam chemical stream flowing through each of said plurality of conduit assemblies and producing a plurality of second signals representative of said water and foam chemical pressure in each conduit assembly; and a plurality of control systems each one responsive to said plurality of first signals and said plurality of second signals for producing a plurality of electrical signals each one for controlling a speed at which one of said plurality of hydraulic motors is driving one of said plurality of rotary gear foam pumps, such that a desired quantity of the liquid chemical foamant in the water stream exiting said plurality of conduit assemblies maintains said desired concentration.

* * * * *